United States Patent
Kuehner et al.

(10) Patent No.: US 12,126,055 B2
(45) Date of Patent: Oct. 22, 2024

(54) VEHICULAR PERFORMANCE ENHANCEMENT

(71) Applicant: Toyota Research Institute, Inc., Los Altos, CA (US)

(72) Inventors: Manuel Ludwig Kuehner, Mountain View, CA (US); Hiroshi Yasuda, San Francisco, CA (US); Avinash Balachandran, Sunnyvale, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 368 days.

(21) Appl. No.: 17/721,803

(22) Filed: Apr. 15, 2022

(65) Prior Publication Data

US 2023/0335875 A1 Oct. 19, 2023

(51) Int. Cl.
  *H01M 50/77* (2021.01)
  *B60L 15/20* (2006.01)
  *B60L 58/10* (2019.01)

(52) U.S. Cl.
  CPC ............ *H01M 50/77* (2021.01); *B60L 15/20* (2013.01); *B60L 58/10* (2019.02); *B60L 2240/22* (2013.01); *B60L 2240/26* (2013.01); *B60L 2240/54* (2013.01); *B60L 2260/34* (2013.01); *H01M 2220/20* (2013.01)

(58) Field of Classification Search
  CPC ... H01M 50/77; H01M 2220/20; B60L 15/20; B60L 58/10; B60L 2240/22; B60L 2240/26; B60L 2240/54; B60L 2260/34
  See application file for complete search history.

(56) References Cited

U.S. PATENT DOCUMENTS

| | | | |
|---|---|---|---|
| 10,093,364 B2 | 10/2018 | Seo | |
| 2014/0139228 A1* | 5/2014 | Tennessen | H01M 8/188 |
| | | | 429/81 |
| 2018/0009450 A1 | 1/2018 | Shaw | |

FOREIGN PATENT DOCUMENTS

| | | |
|---|---|---|
| CN | 108674499 A | 10/2019 |
| CN | 210760225 U | 6/2020 |
| CN | 111845970 A | 10/2020 |

(Continued)

OTHER PUBLICATIONS

Khan Academy, "What is the center of mass?", Retrieved from the Internet: <https://www.khanacademy.org/science/physics/linear-momentum/center-of-mass/a/what-is-center-of-mass>, Retrieved Dec. 9, 2021, 18 pages.

*Primary Examiner* — Yuen Wong
(74) *Attorney, Agent, or Firm* — Christopher G. Darrow; Darrow Mustafa PC

(57) ABSTRACT

A performance enhancement system for an electric vehicle includes a battery pack, a pump system, and a control module. The battery pack contains electrolyte fluid, and the pump system is operable to redistribute the electrolyte fluid within the battery pack. The control module may be configured to identify a vehicle usage event. The vehicle usage event may be a payload event, a pitching event, a rolling event, and/or a yawing event. In response to identifying the vehicle usage event, the control module may be configured to operate the pump system to redistribute the electrolyte fluid within the battery pack to change a static center of mass of the vehicle, a dynamic center of mass of the vehicle, and/or a moment of inertia of the vehicle.

20 Claims, 6 Drawing Sheets

(56) References Cited

FOREIGN PATENT DOCUMENTS

| | | |
|---|---|---|
| CN | 112298381 A | 2/2021 |
| DE | 10353026 A1 | 6/2005 |
| DE | 102009053139 A1 | 5/2011 |
| DE | 102012007875 A1 | 10/2013 |
| DE | 102018213161 A1 | 2/2020 |
| DE | 102020104866 B3 | 8/2021 |
| ES | 2390782 A1 | 11/2012 |
| FR | 2925447 A3 | 6/2009 |

* cited by examiner

VEHICULAR PERFORMANCE ENHANCEMENT

TECHNICAL FIELD

The embodiments disclosed herein relate to vehicle performance and, more particularly, to systems and methods for enhancing the performance of an electric vehicle.

BACKGROUND

Electric vehicles may include battery packs configured to store electrical energy using electrolyte fluid. In conjunction with their drivetrains, electric vehicles may include motors operable to power the wheels using electrical energy from the battery packs.

SUMMARY

Disclosed herein are embodiments of systems and methods for enhancing the performance of an electric vehicle by redistributing electrolyte fluid within a battery pack.

In one aspect, a performance enhancement system for an electric vehicle includes a battery pack, a pump system, and a control module. The battery pack contains electrolyte fluid, and the pump system is operable to redistribute the electrolyte fluid within the battery pack. The control module may be configured to identify a vehicle usage event. In response to identifying the vehicle usage event, the control module may be configured to operate the pump system to redistribute the electrolyte fluid within the battery pack to change the mass distribution of the vehicle.

In another aspect, a performance enhancement system for an electric vehicle includes a battery pack, a pump system, and a control module. The battery pack contains electrolyte fluid, and the pump system is operable to redistribute the electrolyte fluid within the battery pack. The control module may be configured to identify a vehicle usage event. The vehicle usage event may be at least one of a payload event, a pitching event, a rolling event, and a yawing event. In response to identifying the vehicle usage event, the control module may be configured to operate the pump system to redistribute the electrolyte fluid within the battery pack to change at least one of a static center of mass of the vehicle, a dynamic center of mass of the vehicle, and a moment of inertia of the vehicle.

In yet another aspect, a method for enhancing the performance of an electric vehicle involves an electric vehicle comprising a battery pack containing electrolyte fluid and a pump system operable to redistribute the electrolyte fluid within the battery pack. The method includes identifying a vehicle usage event. The method also includes, based on identifying the vehicle usage event, operating the pump system to redistribute the electrolyte fluid within the battery pack to change the mass distribution of the vehicle.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches systems and methods for enhancing the performance of an electric vehicle. A performance enhancement system for an electric vehicle includes a battery pack containing electrolyte fluid and a pump system operable to redistribute the electrolyte fluid within the battery pack. The performance enhancement system also includes a control module configured to identify a vehicle usage event. The vehicle usage event may be a payload event, a pitching event, a rolling event, and/or a yawing event. In response to identifying the vehicle usage event, the control module may be configured to operate the pump system to redistribute the electrolyte fluid within the battery pack to change a static center of mass of the vehicle, a dynamic center of mass of the vehicle, and/or a moment of inertia of the vehicle. A method for enhancing the performance of an electric vehicle includes identifying a vehicle usage event, and based on identifying the vehicle usage event, operating the pump system to redistribute the electrolyte fluid within the battery pack to change the mass distribution of the vehicle.

Figure 1:
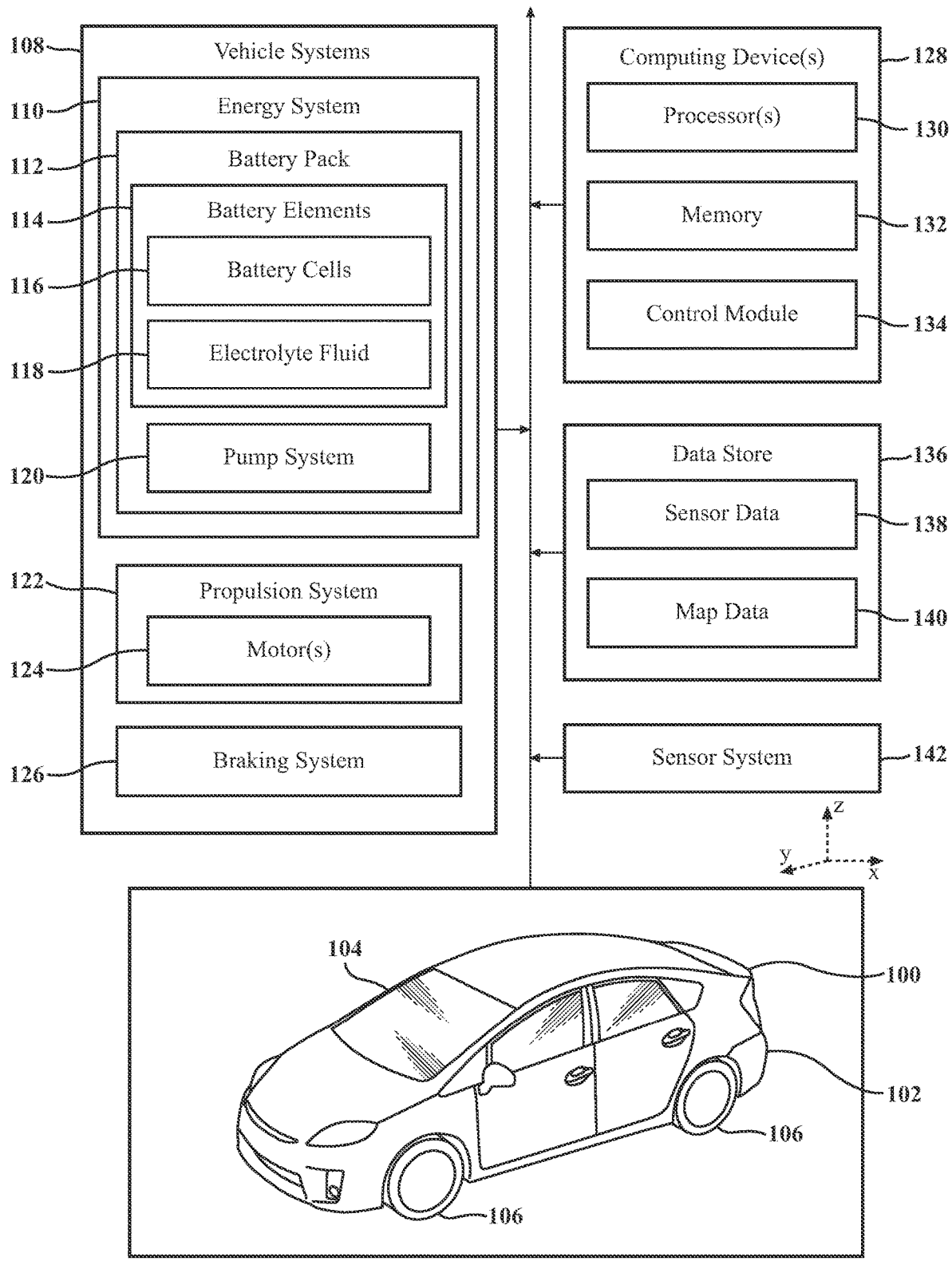
FIG. 1 illustrates a performance enhancement system for a vehicle.

A representative passenger vehicle 100 is shown in FIG. 1. In this description, uses of "front," "forward," and the like, and uses of "rear," "rearward," and the like, refer to the longitudinal directions of the vehicle 100. "Front," "forward," and the like refer to the front (fore) of the vehicle 100, while "rear," "rearward," and the like refer to the back (aft) of the vehicle 100. Uses of "side," "sideways," "transverse," and the like refer to the lateral directions of the vehicle 100, with "driver's side" and the like referring to the left side of the vehicle 100, and "passenger side" and the like referring to the right side of the vehicle 100. The vehicle 100 can define a lateral x axis, a longitudinal y axis, and a vertical z axis.

The vehicle 100 includes an exterior 102 and a number of interior compartments. The compartments include a passenger compartment 104. Among other things, the vehicle 100 includes seats, a dash assembly, an instrument panel, controls, and the like housed in the passenger compartment 104. Additionally, the vehicle 100 includes a drivetrain. As part of the drivetrain, the vehicle 100 includes wheels 106. The wheels 106 support the remainder of the vehicle 100 on the ground. One, some, or all of the wheels 106 are powered to drive the vehicle 100 along the ground. For this purpose, also as part of the drivetrain, in addition to the wheels 106, the vehicle 100 may include any penultimate combination of a transmission, a differential, a drive shaft, and the like, to which the wheels 106 are mechanically connected.

The vehicle 100 includes one or more vehicle systems 108 operable to perform vehicle functions. In addition to the vehicle systems 108, the vehicle 100 includes a sensor system 142, a data store 136, and as a component of one or more computing device(s) 128, the vehicle 100 includes one or more processor(s) 130, a memory 132, and a control module 134 to which the vehicle systems 108, the sensor system 142, and the data store 136 are communicatively connected. The sensor system 142 is operable to detect information about the vehicle 100, as described in further detail below. The data store 136 is configured to store sensor data 138 from the sensor system 142 as well as any other suitable type of information about the vehicle 100, for example, map data 140, as described in further detail below. The processor(s) 130, the memory 132, and the control module 134 together serve as the computing device(s) 128 whose control module 134 is employable to orchestrate the operation of the vehicle 100, in whole or in part. Specifically, the control module 134 operates the vehicle systems 108 based on information stored in the data store 136. Accordingly, as a prerequisite to operating the vehicle systems 108, the control module 134 gathers information about the vehicle 100, including the information stored in the data store 136. The control module 134 then evaluates the information about the vehicle 100 and operates the vehicle systems 108 based on its evaluation.

The vehicle systems 108 are part of, mounted to, or otherwise supported by the vehicle 100. The vehicle systems 108 may be housed, in whole or in part, below the passenger compartment 104 or elsewhere in the vehicle 100. Each vehicle system 108 includes one or more vehicle elements. On behalf of the vehicle system 108 to which it belongs, each vehicle element is operable to perform, in whole or in part, any combination of vehicle functions with which the vehicle system 108 is associated. It will be understood that the vehicle elements, as well as the vehicle systems 108 to which they belong, may but need not be mutually distinct.

The vehicle systems 108 include an energy system 110 and a propulsion system 122. The energy system 110 and the propulsion system 122 are electrically connected to one another. Moreover, the drivetrain is mechanically connected to the propulsion system 122. The propulsion system 122 and the drivetrain together serve as an electrified powertrain for the vehicle 100. The energy system 110 is operable to perform one or more energy functions, including but not limited to storing and otherwise handling energy. The propulsion system 122 is operable to perform one or more propulsion functions using energy from the energy system 110, including but not limited to powering the wheels 106. The vehicle systems 108 also include a braking system 126. The braking system 126 is operable to perform one or more braking functions such as braking the wheels 106 or otherwise slowing the wheels 106 or stopping the vehicle 100. As a part of the propulsion system 122, the vehicle 100 includes one or more motors 124. As a part of the energy system 110, the vehicle 100 includes a battery pack 112. The motor(s) 124 and the battery pack 112 are electrically connected to one another. Moreover, the drivetrain is mechanically connected to the motor(s) 124. The battery pack 112 is configured to store electrical energy. In conjunction with the drivetrain, the motor(s) 124 are operable to power the wheels 106 using electrical energy from the battery pack 112.

Figure 2:
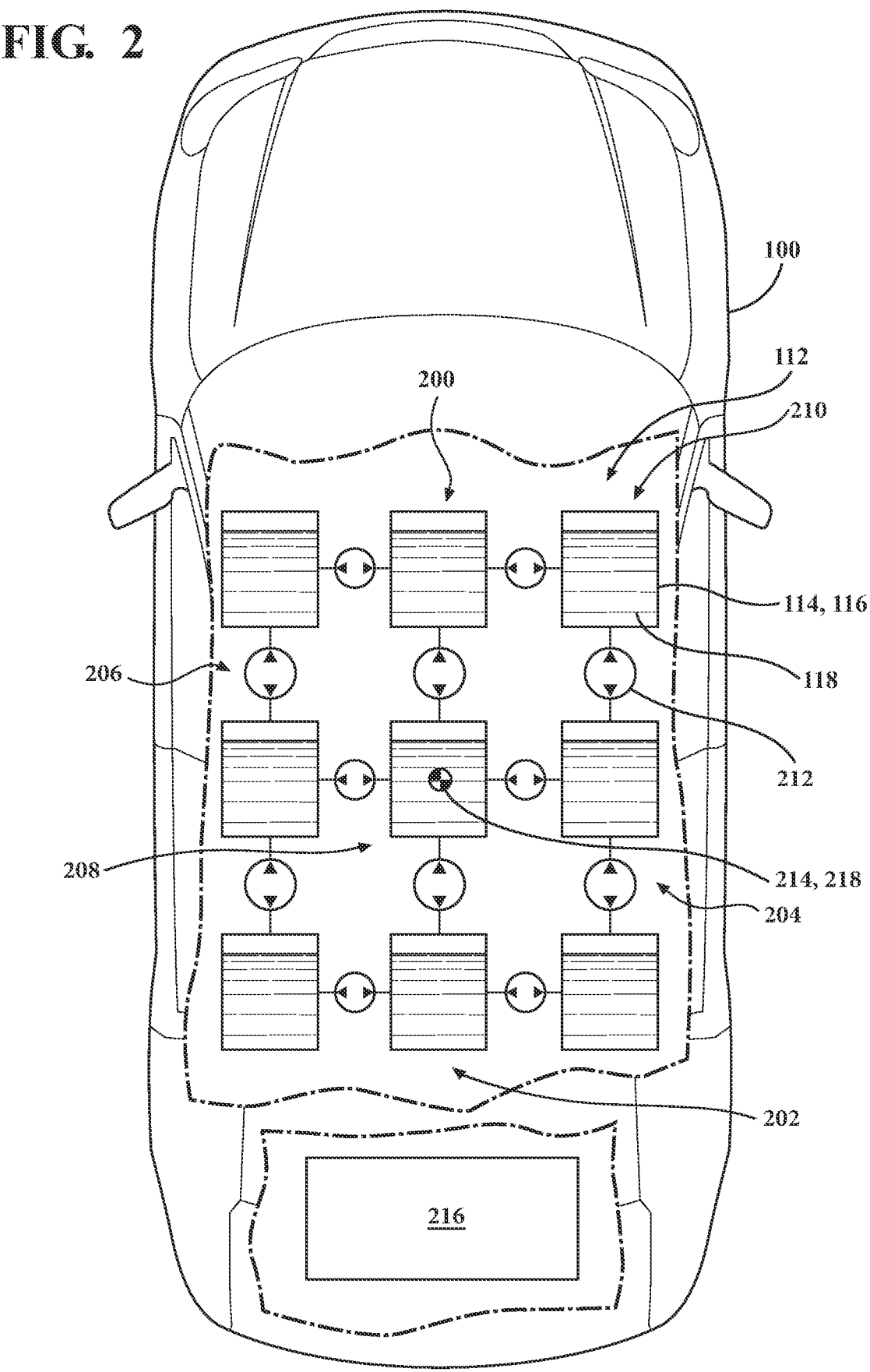
FIG. 2 illustrates a vehicle experiencing a payload event, the vehicle including a battery pack including a pump system and battery cells having battery electrolyte fluid.

The battery pack 112 can thus be a conventional battery pack 112 typically found in electric vehicles, that is, a traction battery pack 112 for handling the electrical energy loads from the motor(s) 124. The battery pack 112 may be fixed to the vehicle 100. With additional reference to FIG. 2, the battery pack 112 includes a front 200, a rear 202, a right side 204, a left side 206, an inside 208, and an outside 210. The battery pack 112 can include internal battery elements 114. Among the battery elements 114, the battery pack 112 can include battery cells 116 configured to store electrical energy. The battery pack 112 can include any suitable number of battery cells 116. In one example, as shown, the battery pack 112 can include nine battery cells 116. The battery cells 116 can be conventional battery cells 116 typically found in traction battery packs and/or can be any suitable type of battery cells 116. For example, the battery cells 116 can be lead-acid battery cells, lithium-ion battery cells, and/or non-sealed wet battery cells. In these and other implementations, as part of the battery cells 116, the battery pack 112 can contain electrolyte fluid 118 (e.g., battery fluid) used for charging and recharging the battery cells 116. In some arrangements, also among the battery elements 114, the battery pack 112 can include one or more reservoirs in addition to the battery cells 116. The battery pack 112 can include any suitable number of reservoir(s). Similar to the battery cells 116, the battery pack 112 can contain electrolyte fluid 118 as part of the reservoir(s). For example, the reservoir(s) can store electrolyte fluid 118 usable for charging and recharging the battery cells 116.

The battery pack 112 can also include a pump system 120. The pump system 120 is operable to redistribute the electrolyte fluid 118 within the battery pack 112. As part of the pump system 120, the battery pack 112 can include one or more pumps 212 fluidly connecting one, some, or all of the battery cells 116 and/or one, some, or all of the reservoir(s). The pumps 212 can be operable to pump the electrolyte fluid 118 between the battery cells 116 and/or the reservoir(s) to redistribute the electrolyte fluid 118 within the battery pack 112. The pumps 212 can be bidirectional pumps or any other suitable type of pump. As a product of redistributing the electrolyte fluid 118 within the battery pack 112, the pump system 120 is operable to redistribute mass within the battery pack 112.

It may be advantageous to redistribute mass within the battery pack 112 for a number of reasons. For example, the vehicle 100 may be used in a way that causes changes to the original equipment manufacturer (OEM) mass distribution and/or the ideal runtime mass distribution of the vehicle 100. Accordingly, the pump system 120 may be operable to redistribute mass within the battery pack 112 to change the mass distribution of the vehicle 100, which may change the center of mass (including the static center of mass and/or the dynamic center of mass) and/or the moment of inertia of the vehicle 100. Changing the center of mass and/or the moment of inertia of the vehicle 100 may help to enhance the performance of the vehicle 100 during one or more vehicle usage events.

In some instances, the vehicle 100 may define an ideal static center of mass 214. The ideal static center of mass 214 may be defined by the OEM or may be calculated by the control module 134 based on information about the vehicle 100 such as its dimensions, its weight, its weight distribution, and/or any other factors that may affect the ideal static center of mass 214. The vehicle 100 may also define an actual static center of mass, the position of which may vary based on the static payload distribution of the vehicle 100. During use of the vehicle 100, in order to improve the operation of the vehicle 100, it may be advantageous that the actual static center of mass is located at or substantially near the ideal static center of mass 214.

Accordingly, the vehicle systems 108, the sensor system 142, the data store 136, the processor(s) 130, the memory 132, and the control module 134 may be leveraged to implement a performance enhancement system to improve the dynamics, stability, and/or handling of the vehicle 100 during its use, by redistributing mass within the battery pack 112 to shift the actual static center of mass toward the ideal static center of mass 214. The control module 134 may thus be configured to identify a vehicle usage event. The control module 134 may identify the vehicle usage event as an actual and/or an anticipated vehicle usage event using data stored in the data store 136, for example, the sensor data 138 and/or the map data 140, as mentioned above and described in further detail below.

A vehicle usage event may be any type of vehicle usage event. In one example, a vehicle usage event may be a payload event. A payload event may be defined as any event that affects the payload of the vehicle 100, including loading a payload, unloading a payload, and/or shifting a payload within the vehicle 100. For example, a payload event can include an event in which one or more passengers enter or exit the vehicle 100, an event in which cargo is loaded into the vehicle 100, an event in which cargo is unloaded from the vehicle 100, and/or an event in which passengers and/or cargo shift within the vehicle 100. The payload event may occur in one or more areas of the vehicle 100. For example, the payload event may be a front payload event, a rear payload event, a right payload event, and/or a left payload event.

In response to identifying a payload event, the control module 134 can be configured to operate the pump system 120 to redistribute electrolyte fluid 118, and thus mass, within the battery pack 112 to shift the actual static center of mass toward the ideal static center of mass 214 (e.g., to counterbalance the vehicle 100). In other words, in response to identifying a payload event, the control module 134 can be configured to operate the pump system 120 to redistribute electrolyte fluid 118, and thus mass, within the battery pack 112 in a direction away from the payload. For example, with reference to FIG. 2, the vehicle 100 may experience a rear payload event in which cargo 216 is loaded into the rear of the vehicle 100, for example, into a trunk of the vehicle 100. The rear payload event may cause the actual static center of mass to shift from the ideal static center of mass 214 toward the rear of the vehicle 100. Accordingly, in response to identifying the rear payload event, the control module 134 can be configured to operate the pump system 120 to redistribute electrolyte fluid 118 in the direction away from the payload toward the front 200 of the battery pack 112.

In addition to the ideal static center of mass 214, as described above, the vehicle 100 may define an ideal dynamic center of mass 218. In some instances, the ideal dynamic center of mass 218 may be located in the same position as the ideal static center of mass 214. The ideal dynamic center of mass 218 may be defined by the OEM or may be calculated by the control module 134 based on information about the vehicle 100 such as its dimensions, weight, weight distribution, acceleration, angular velocity, angular, and/or any other factors that may affect the ideal dynamic center of mass 218. The vehicle 100 may also define an actual dynamic center of mass based on its dynamic payload distribution. During use of the vehicle 100, in order to improve the operation of the vehicle 100, it may be advantageous that the actual dynamic center of mass is located at or substantially near the ideal dynamic center of mass 218.

Thus, as well as identifying a payload event, the control module 134 may be configured to identify a pitching event, a rolling event, and/or a yawing event. A pitching event may be defined as an event that causes the vehicle 100 to rotate about the x axis. A pitching event may include an uphill driving event, a downhill driving event, or any other type of event that causes the vehicle 100 to pitch. A rolling event may be defined as an event that causes the vehicle 100 to rotate about the y axis. A rolling event may include a right cant driving event, a left cant driving event, or any other type of event that causes the vehicle 100 to roll. A yawing event may be defined as an event that causes the vehicle 100 to rotate about the z axis. A yawing event may include a turning event or a loss of traction event (e.g., a spinning out event), or any other type of event that causes the vehicle 100 to yaw.

Figure 3A:
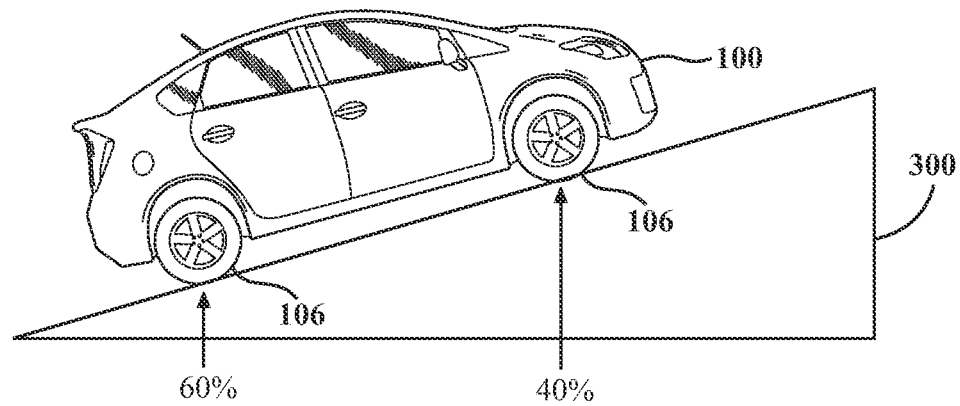
FIG. 3A illustrates a vehicle experiencing a pitching event.
Figure 3B:
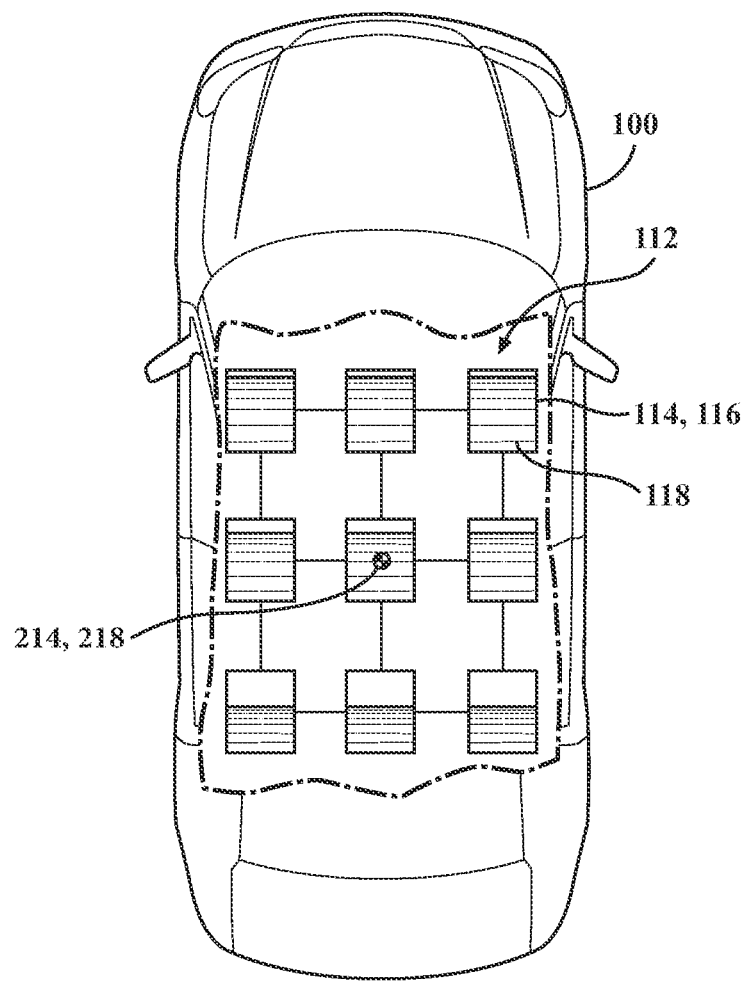
FIG. 3B illustrates an example of operating a pump system of a battery pack of a vehicle during a pitching event.

In response to identifying a pitching event, a rolling event, and/or a yawing event, the control module 134 can be configured to operate the pump system 120 to redistribute electrolyte fluid 118, and thus mass, within the battery pack 112 to shift the actual dynamic center of mass toward the ideal dynamic center of mass 218 (e.g., to counterbalance the vehicle 100). In other words, in response to identifying a pitching event, a rolling event, and/or a yawing event, the control module 134 can be configured to operate the pump system 120 to redistribute electrolyte fluid 118, and thus mass, within the battery pack 112 away from the actual dynamic center of mass. For example, referring to FIG. 3A, the vehicle 100 may experience an uphill driving event in which the vehicle 100 is driving up a hill 300. During the uphill driving event, the weight of the vehicle 100 may be unevenly distributed across the wheels 106; for example, the rear wheels 106 may carry about 60% of the weight and the front wheels 106 may carry about 40% of the weight. This may cause the actual dynamic center of mass to shift from the ideal dynamic center of mass 218 toward the rear of the vehicle 100. Accordingly, as shown in FIG. 3B, in response to identifying the uphill driving event, the control module 134 can be configured to operate the pump system 120 to redistribute electrolyte fluid 118 away from the actual dynamic center of mass toward the front 200 of the battery pack 112.

Figure 4A:
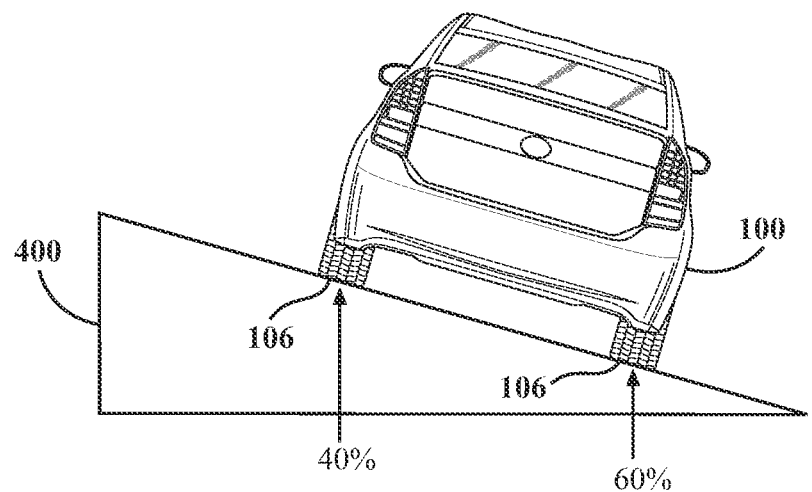
FIG. 4A illustrates a vehicle experiencing a rolling event.
Figure 4B:
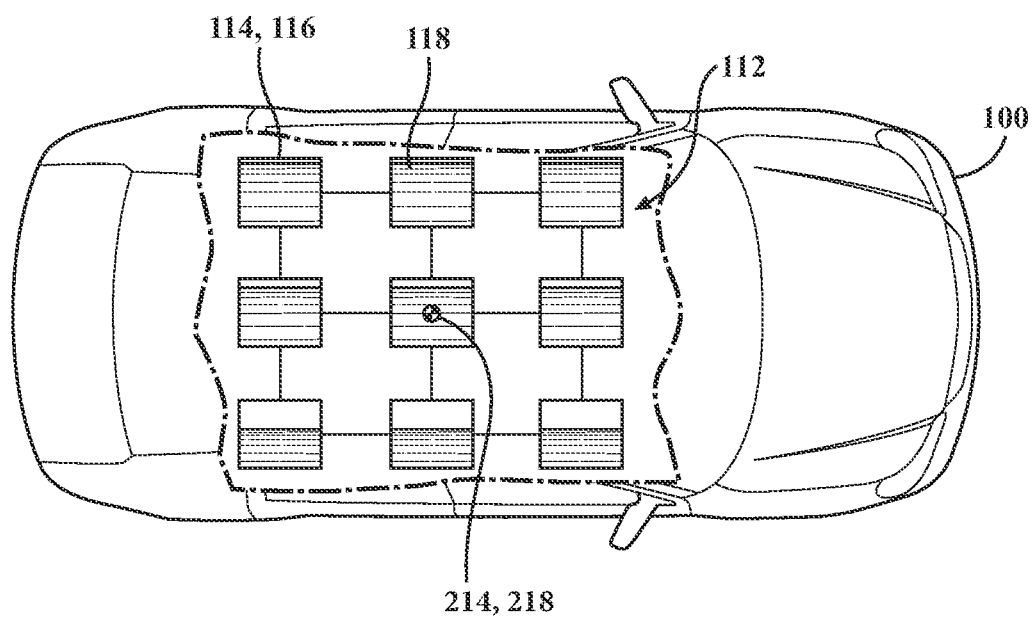
FIG. 4B illustrates an example of operating a pump system of a battery pack of a vehicle during a rolling event.

In another example, with reference to FIG. 4A, the vehicle 100 may experience a right cant driving event in which the vehicle 100 is driving on a right cant 400. During the right cant driving event, the weight of the vehicle 100 may be unevenly distributed across the wheels 106; for example, the right wheels 106 may carry about 60% of the weight and the left wheels 106 may carry about 40% of the weight. This may cause the actual dynamic center of mass to shift from the ideal dynamic center of mass 218 toward the right side of the vehicle 100. Accordingly, as shown in FIG. 4B, in response to identifying the right cant event, the control module 134 can be configured to operate the pump system 120 to redistribute electrolyte fluid 118 away from the actual dynamic center of mass toward the left side 206 of the battery pack 112.

Figure 5A:
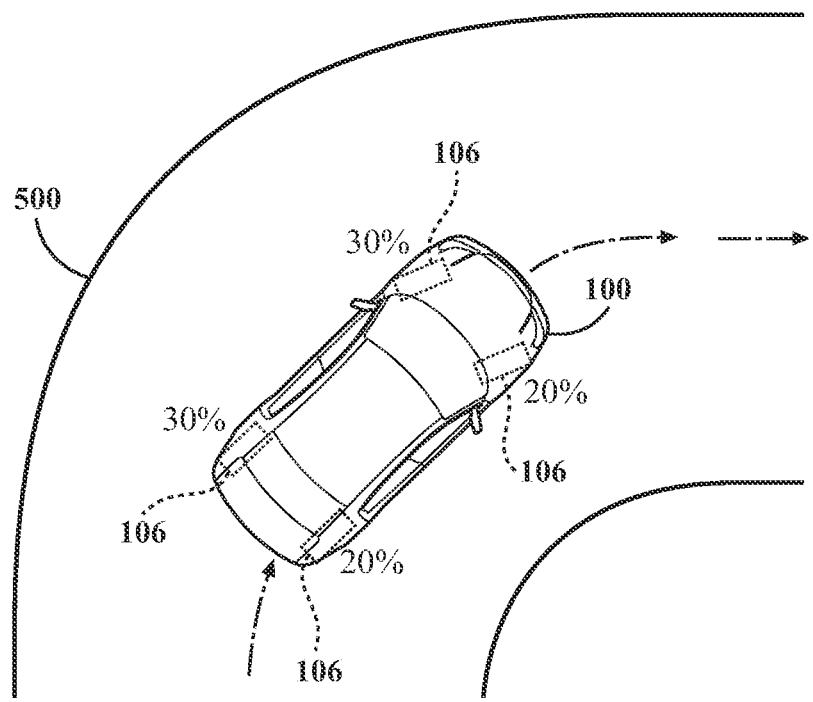
FIG. 5A illustrates a vehicle experiencing a yawing event.
Figure 5B:
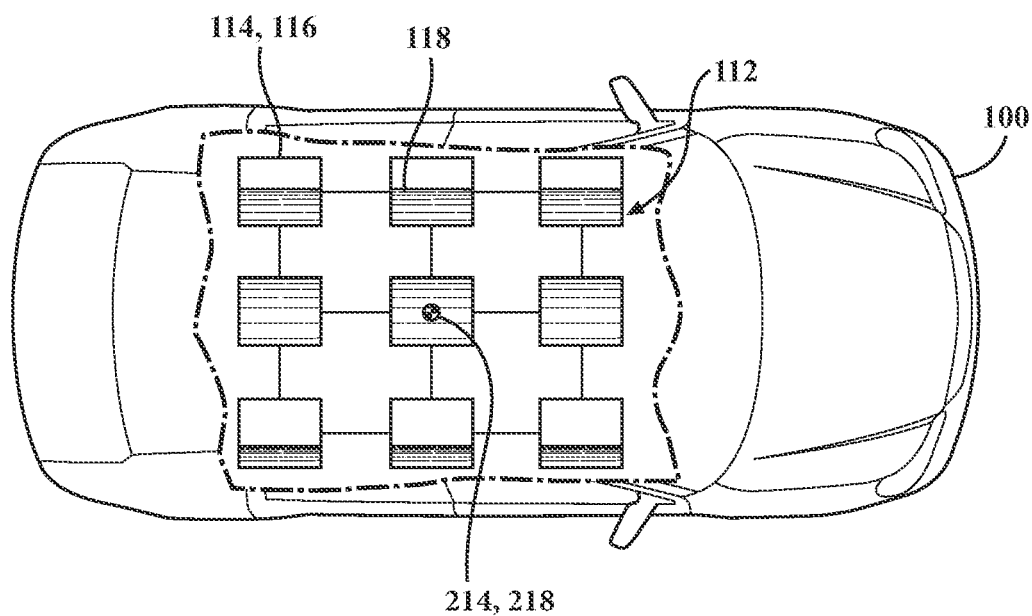
FIG. 5B illustrates an example of operating a pump system of a battery pack of a vehicle during a yawing event.

In another example, with reference to FIG. 5A, the vehicle 100 may experience a turning event (specifically, a right-turning event) in which the vehicle 100 is driving through a turn 500. During the turning event, the weight of the vehicle 100 may be unevenly distributed across the wheels 106; for example, the left wheels 106 may carry about 60% of the weight (e.g., the front left wheel carries about 30% of the weight and the rear left wheel carries about 30% of the weight) and the right wheels 106 may carry about 40% of the weight (e.g., the front right wheel carries about 20% of the weight and the rear right wheel carries about 20% of the weight). This may cause the actual dynamic center of mass to shift from the ideal dynamic center of mass 218 toward the left side of the vehicle 100. Accordingly, as shown in FIG. 5B, in response to identifying the turning event, the control module 134 can be configured to operate the pump system 120 to redistribute electrolyte fluid 118 in a direction away from the actual dynamic center of mass toward the right side 204 of the battery pack 112.

As described above, the pump system 120 may also be operable to redistribute mass within the battery pack 112 to change the mass distribution of the vehicle 100, which may change the moment of inertia of the vehicle 100. Changing the moment of inertia of the vehicle 100 may help to enhance the performance of the vehicle 100 during one or more vehicle usage events, for example, a yawing event. For example, with continued reference to FIGS. 5A and 5B, during a yawing event such as a turning event, it may be advantageous to increase the moment of inertia of the vehicle 100 to facilitate turning. Accordingly, in response to identifying the turning event, the control module 134 can be configured to operate the pump system 120 to redistribute electrolyte fluid 118 toward the outside 210 of the battery pack 112. In some instances, though not shown, it may be advantageous to decrease the moment of inertia of the vehicle 100 to impede turning. For example, the vehicle 100 may experience a loss of traction event (e.g., a spinning out event). Accordingly, in response to identifying a loss of traction event, the control module 134 can be configured to operate the pump system 120 to redistribute electrolyte fluid 118 toward an inside 208 of the battery pack 112.

Figure 6:
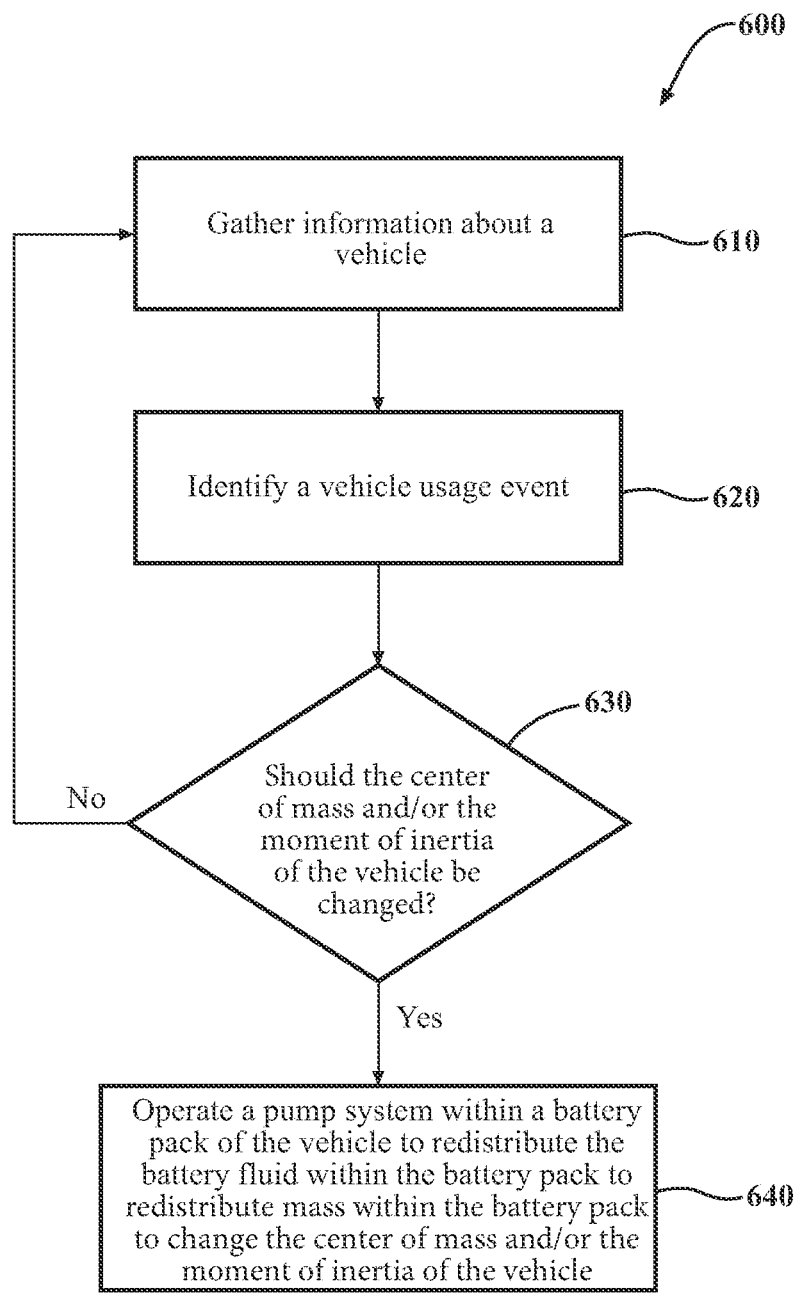
FIG. 6 illustrates a method of operating a pump system of a battery pack of a vehicle during a vehicle usage event.

The operations of a method 600 for enhancing the performance of a vehicle 100 are shown in FIG. 6. The method 600 described may be applicable to the arrangements described above, but it is to be understood that the method 600 can be carried out with other suitable systems and arrangements. Moreover, the method 600 may include other steps not shown here, and the method 600 is not limited to including every step shown. The blocks illustrated here as part of the method 600 are not limited to the particular chronological order. Indeed, some of the blocks may be performed in a different order than what is shown and/or at least some of the blocks shown can occur simultaneously. According to the method 600, the control module 134 can be configured to operate the vehicle systems 108 based on various information sensed about the vehicle 100 and its external environment.

The method 600 may begin at operation 610. In operation 610, the control module 134 may gather information about the vehicle 100 such as map data 140 and/or sensor data 138 from a sensor system 142 of the vehicle 100. The information about the vehicle 100 may include the speed of the vehicle 100, the acceleration of the vehicle 100, tire pressure information, information about a payload of the vehicle 100, etc. The method 600 may then proceed to operation 620, in which the control module 134 may identify a vehicle usage event. The control module 134 may identify the vehicle usage event based on the data and/or information gathered in operation 610. The vehicle usage event may include a payload event, a pitching event, a rolling event, and/or a yawing event, as described above.

In response to identifying a vehicle usage event, the method 600 may proceed to operation 630. In operation 630, the control module 134 can be configured to determine whether the center of mass (e.g., the static center of mass and/or the dynamic center of mass) and/or the moment of inertia should be changed based on the vehicle usage event. For example, during a payload event, the actual static center of mass of the vehicle 100 may shift from an ideal static center of mass 214 of the vehicle 100. The control module 134 may determine that the actual static center of mass should be changed toward the ideal static center of mass 214. In another example, during a pitching event, a rolling event, and/or a yawing event, the actual dynamic center of mass of the vehicle 100 may shift from an ideal dynamic center of mass 218 of the vehicle 100. The control module 134 may determine that the actual dynamic center of mass should be changed toward the ideal dynamic center of mass 218. In another example, during a turning event, it may be advantageous to decrease the moment of inertia to facilitate yawing of the vehicle 100, and during a loss of traction event, it may be advantageous to increase the moment of inertia to impede yawing of the vehicle 100.

If the control module 134 determines that the center of mass and/or the moment of inertia does not need to be changed, the method 600 can return to operation 610. If the control module 134 determines that the center of mass and/or the moment of inertia should be changed, the method can proceed to operation 640. In operation 640, the control module 134 can be configured to operate a pump system 120 within a battery pack 112 of the vehicle 100 to redistribute electrolyte fluid 118 within the battery pack 112 in order to redistribute mass within the battery pack 112. Redistributing mass within the battery pack 112 may change the center of mass and/or the moment of inertia of the vehicle 100. For example, during a payload event, the control module 134 can be configured to operate the pump system 120 to redistribute electrolyte fluid 118 away from the payload. In another example, during a pitching event, a rolling event, and/or a yawing event, the control module 134 can be configured to operate the pump system 120 to redistribute electrolyte fluid 118 away from the actual dynamic center of mass. In another example, during a yawing event, the control module 134 can be configured to operate the pump system 120 to redistribute electrolyte fluid 118 toward an inside 208 of the battery pack 112 to facilitate yawing, or the control module 134 can be configured to operate the pump system 120 to redistribute electrolyte fluid 118 toward an outside 210 of the battery pack 112 to impede yawing.

Referring back to FIG. 1, as part of the sensor system 142, the vehicle 100 includes vehicle sensors. The vehicle sensors monitor the vehicle 100 in real-time. The vehicle sensors, on behalf of the sensor system 142, are operable to detect information about the vehicle 100, including information about the operation of the vehicle 100. For example, the vehicle sensors can be configured to detect and/or acquire data about various operating parameters of the vehicle 100. The vehicle sensors can include a speedometer configured to determine the speed of the vehicle 100 and an accelerometer configured to determine the rate and direction of the acceleration of the vehicle 100. The vehicle sensors can also include a gyroscope, steering sensors such as steering wheel angle sensors, suspension sensors, cameras within the vehicle 100, etc. The vehicle sensors can include various weight detection sensors. The weight detection sensors can be configured to detect the weight and the location of the payload within the vehicle 100. For example, the weight detection sensors can include one or more occupant detection sensors configured to detect the occupancy of the seats of the vehicle 100, and one or more cargo detection sensors configured to detect the weight and location of cargo within the vehicle 100, for example, within a trunk of the vehicle 100. The vehicle sensors can also include one or more tire pressure sensors. The tire pressure sensor(s) can be configured to detect the pressure of one or more tires of the wheels 106 of the vehicle 100.

As part of the sensor system 142, the vehicle 100 also includes external environment sensors. The external environment sensors monitor an external environment of the vehicle 100 in real-time. The external environment sensors, on behalf of the sensor system 142, are operable to detect information about the external environment of the vehicle 100. The external environment sensors can be located on the exterior 102 of the vehicle 100 and/or can be located in any other suitable location on the vehicle 100. The external environment sensors can include one or more cameras. The external environment sensors can also include one or more distance sensors, such as LIDAR or radar sensors.

The vehicle 100 can also include a data store 136. The data store 136 can store sensor data 138 from the sensor system 142. The data store 136 can also include map data 140. The map data 140 can include maps of one or more geographic areas. In some instances, the map data 140 can include information or data on roads, traffic control devices, road markings, structures, features, and/or landmarks in the one or more geographic areas. The map data 140 can be in any suitable form. In some instances, the map data 140 can include aerial views of an area. In some instances, the map data 140 can include ground views of an area, including 360-degree ground views. The map data 140 can include measurements, dimensions, distances, and/or information for one or more items included in the map data 140 and/or relative to other items included in the map data 140. The map data 140 can include a digital map with information about road geometry. The map data 140 can be high quality and/or highly detailed.

The sensor data 138 and/or the map data 140 may be stored in the data store 136 and may be accessed by the control module 134 to identify a vehicle usage event. For example, the control module 134 may identify a pitching event and/or a rolling event by identifying uneven tire pressure between the wheels 106. In another example, the control module 134 may identify a yawing event by identifying a high angular velocity of the vehicle 100. The map data 140 may also be accessed by the computing device(s) 128 to identify an anticipated vehicle usage event. For example, the control module 134 may determine, based on the map data 140, that the vehicle 100 will encounter a hill and/or a turn.

As noted above, the processor(s) 130, the memory 132, and the control module 134 together serve as the computing device(s) 128 whose control module 134 orchestrates the operation of the vehicle 100, including but not limited to the operation of the vehicle systems 108. The control module 134 may be a global control module. Relatedly, as part of a central control system, the vehicle 100 may include a global control unit (GCU) with which the control module 134 is communicatively connected. Alternatively, the control module 134 may be a global control module. Relatedly, as part of a central control system, the vehicle 100 may include a global control unit (GCU) to which the control module 134 belongs. Although the vehicle 100, as shown, includes one control module 134, it will be understood that this disclosure is applicable in principle to otherwise similar vehicles including multiple control modules.

The processor(s) 130 may be any components configured to execute any of the processes described herein or any form of instructions to carry out such processes or cause such processes to be performed. The processor(s) 130 may be implemented with one or more general-purpose or special-purpose processors. Examples of suitable processors include microprocessors, microcontrollers, digital signal processors or other forms of circuitry that execute software. Other examples of suitable processors include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processor(s) 130 may include at least one hardware circuit (e.g., an integrated circuit) configured to carry out instructions contained in program code. In arrangements where there are multiple processor(s) 130, the processor(s) 130 may work independently from each other or in combination with one another.

The memory 132 may be a non-transitory computer readable medium. The memory 132 may include volatile or nonvolatile memory, or both. Examples of suitable memory include random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives, or any other suitable storage medium, or any combination of these. The memory 132 includes stored instructions in program code. Such instructions are executable by the processor(s) 130 or the control module 134. The memory 132 may be part of the processor(s) 130 or the control module 134 or may be communicatively connected the processor(s) 130 or the control module 134.

Generally speaking, the control module 134 includes instructions that may be executed by the processor(s) 130. The control module 134 may be implemented as computer readable program code that, when executed by the processor(s) 130, execute one or more processes described herein. Such computer readable program code may be stored in the memory 132. The control module 134 may be part of the processor(s) 130 or may be communicatively connected the processor(s) 130.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A performance enhancement system for an electric vehicle, comprising:
   a battery pack containing electrolyte fluid;
   a pump system, including one or more pumps, operable to redistribute the electrolyte fluid within the battery pack; and
   a control module, including one or more processors, the control module configured to identify a vehicle usage event, and in response to identifying the vehicle usage event, operate the pump system to redistribute the electrolyte fluid within the battery pack to change a mass distribution of the electric vehicle.

2. The performance enhancement system of claim 1, wherein the vehicle usage event is a payload event, and wherein the control module is configured to operate the pump system to redistribute the electrolyte fluid within the battery pack to shift an actual static center of mass of the electric vehicle toward an ideal static center of mass of the electric vehicle, wherein the ideal static center of mass of the electric vehicle is defined by an original equipment manufacturer of the electric vehicle or is calculated by the control module.

3. The performance enhancement system of claim 1, wherein the vehicle usage event is at least one of a pitching event, a rolling event, and a yawing event, and wherein the control module is configured to operate the pump system to redistribute the electrolyte fluid within the battery pack to shift an actual dynamic center of mass of the electric vehicle toward an ideal dynamic center of mass of the electric vehicle, wherein the ideal dynamic center of mass of the electric vehicle is defined by an original equipment manufacturer of the electric vehicle or is calculated by the control module.

4. The performance enhancement system of claim 1, wherein the vehicle usage event is a yawing event, and wherein the control module is configured to operate the pump system to redistribute the electrolyte fluid within the battery pack to change a moment of inertia of the electric vehicle.

5. The performance enhancement system of claim 4, wherein the yawing event is a turning event, and wherein the control module is configured to operate the pump system to redistribute the electrolyte fluid within the battery pack toward an inside of the battery pack to decrease the moment of inertia to facilitate the yawing event.

6. The performance enhancement system of claim 4, wherein the yawing event is a loss of traction event, and wherein the control module is configured to operate the pump system to redistribute the electrolyte fluid within the battery pack toward an outside of the battery pack to increase the moment of inertia to impede the yawing event.

7. The performance enhancement system of claim 1, wherein identifying a vehicle usage event is an anticipated vehicle usage event, wherein the control module is configured to identify the anticipated vehicle usage event based on map data.

8. A performance enhancement system for an electric vehicle, comprising:
   a battery pack containing electrolyte fluid;
   a pump system, including one or more pumps, operable to redistribute the electrolyte fluid within the battery pack; and
   a control module, including one or more processors, the control module configured to identify a vehicle usage event, the vehicle usage event being at least one of a payload event, a pitching event, a rolling event, and a yawing event, and in response to identifying the vehicle usage event, operate the pump system to redistribute the electrolyte fluid within the battery pack to change at least one of a static center of mass of the electric vehicle, a dynamic center of mass of the electric vehicle, and a moment of inertia of the electric vehicle.

9. The performance enhancement system of claim 8, wherein the vehicle usage event is a payload event, and wherein the control module is configured to operate the pump system to redistribute the electrolyte fluid within the battery pack to shift an actual static center of mass of the electric vehicle toward an ideal static center of mass of the electric vehicle, wherein the ideal static center of mass of the electric vehicle is defined by an original equipment manufacturer of the electric vehicle or is calculated by the control module.

10. The performance enhancement system of claim 8, wherein the vehicle usage event is at least one of a pitching event, a rolling event, and a yawing event, and wherein the control module is configured to operate the pump system to redistribute the electrolyte fluid within the battery pack to shift an actual dynamic center of mass of the electric vehicle toward an ideal dynamic center of mass of the electric vehicle, wherein the ideal dynamic center of mass of the electric vehicle is defined by an original equipment manufacturer of the electric vehicle or is calculated by the control module.

11. The performance enhancement system of claim 8, wherein the vehicle usage event is a yawing event, and wherein the control module is configured to operate the pump system to redistribute the electrolyte fluid within the battery pack to change a moment of inertia of the electric vehicle.

12. The performance enhancement system of claim 11, wherein the yawing event is a turning event, and wherein the control module is configured to operate the pump system to redistribute the electrolyte fluid within the battery pack toward an inside of the battery pack to decrease the moment of inertia to facilitate the yawing event.

13. The performance enhancement system of claim 11, wherein the yawing event is a loss of traction event, and wherein the control module is configured to operate the pump system to redistribute the electrolyte fluid within the battery pack toward an outside of the battery pack to increase the moment of inertia to impede the yawing event.

14. The performance enhancement system of claim 8, wherein identifying a vehicle usage event is an anticipated vehicle usage event, wherein the control module is configured to identify the anticipated vehicle usage event based on map data.

15. A method for enhancing a performance of an electric vehicle, the electric vehicle comprising a battery pack containing electrolyte fluid and a pump system including one or more pumps operable to redistribute the electrolyte fluid within the battery pack, the method comprising:
   identifying a vehicle usage event; and
   based on identifying the vehicle usage event, operating the pump system to redistribute the electrolyte fluid within the battery pack to change a mass distribution of the electric vehicle.

16. The method of claim 15, wherein identifying a vehicle usage event includes identifying a payload event, and wherein operating the pump system to redistribute the electrolyte fluid within the battery pack to change the mass distribution of the electric vehicle includes operating the pump system to redistribute the electrolyte fluid within the battery pack to shift an actual static center of mass of the electric vehicle toward an ideal static center of mass of the electric vehicle, wherein the ideal static center of mass of the electric vehicle is defined by an original equipment manufacturer of the electric vehicle or is calculated by a control module of the vehicle.

17. The method of claim 15, wherein identifying a vehicle usage event includes identifying at least one of a pitching event, a rolling event, and a yawing event, and wherein operating the pump system to redistribute the electrolyte fluid within the battery pack to change the mass distribution of the electric vehicle includes operating the pump system to redistribute the electrolyte fluid within the battery pack to shift an actual dynamic center of mass of the electric vehicle toward an ideal dynamic center of mass of the electric vehicle, wherein the ideal dynamic center of mass of the electric vehicle is defined by an original equipment manufacturer of the electric vehicle or is calculated by a control module of the electric vehicle.

18. The method of claim 15, wherein identifying a vehicle usage event includes identifying a yawing event, and wherein operating the pump system to redistribute the electrolyte fluid within the battery pack to change the mass distribution of the electric vehicle includes operating the pump system to redistribute the electrolyte fluid within the battery pack to change a moment of inertia of the electric vehicle.

19. The method of claim 18, wherein identifying a yawing event includes identifying a turning event, and wherein operating the pump system to redistribute the electrolyte fluid within the battery pack to change a moment of inertia of the electric vehicle includes operating the pump system to redistribute the electrolyte fluid within the battery pack toward an inside of the battery pack to decrease the moment of inertia to facilitate the yawing event.

20. The method of claim 18, wherein identifying a yawing event includes identifying a loss of traction event, and wherein operating the pump system to redistribute the electrolyte fluid within the battery pack to change a moment of inertia of the electric vehicle includes operating the pump system to redistribute the electrolyte fluid within the battery pack toward an outside of the battery pack to increase the moment of inertia to impede the yawing event.

* * * * *